(12) United States Patent
Szolak et al.

(10) Patent No.: US 12,345,191 B2
(45) Date of Patent: Jul. 1, 2025

(54) DEVICE AND METHOD FOR EXHAUST GAS POST TREATMENT AND USE THEREOF

(71) Applicant: FRAUNHOFER-GESELLSCHAFT ZUR FÖRDERUNG DER ANGEWANDTEN FORSCHUNG E.V., Munich (DE)

(72) Inventors: Robert Szolak, Freiburg (DE); Alexander Susdorf, Freiburg (DE); Florian Rümmele, Freiburg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 400 days.

(21) Appl. No.: 17/627,596

(22) PCT Filed: Jul. 15, 2020

(86) PCT No.: PCT/EP2020/070017
§ 371 (c)(1),
(2) Date: Jan. 14, 2022

(87) PCT Pub. No.: WO2021/009240
PCT Pub. Date: Jan. 21, 2021

(65) Prior Publication Data
US 2022/0259998 A1      Aug. 18, 2022

(30) Foreign Application Priority Data

Jul. 15, 2019  (DE) .................... 10 2019 210 413.4

(51) Int. Cl.
*F01N 3/20*  (2006.01)
*B01D 53/58*  (2006.01)
(Continued)

(52) U.S. Cl.
CPC ....... *F01N 3/2066* (2013.01); *B01D 53/9431* (2013.01); *F01N 3/0892* (2013.01);
(Continued)

(58) Field of Classification Search
CPC combination set(s) only.
See application file for complete search history.

(56) References Cited

U.S. PATENT DOCUMENTS

| 6,176,078 B1 * | 1/2001 | Balko | ................ | F01N 13/0093 |
| | | | | 60/275 |
| 7,188,469 B2 * | 3/2007 | Bonadies | .............. | F01N 13/009 |
| | | | | 60/287 |

(Continued)

FOREIGN PATENT DOCUMENTS

| DE | 102006060669 B4 | 9/2010 |
| DE | 102014202291 A1 | 8/2015 |

(Continued)

OTHER PUBLICATIONS

Office Action received for EP Application No. 20 743 107.3 mailed Feb. 8, 2023 (5 pages).

(Continued)

*Primary Examiner* — Binh Q Tran
(74) *Attorney, Agent, or Firm* — Hussey IP, LLC

(57) ABSTRACT

A method for exhaust gas post treatment is provided, comprising the following steps: a) providing a nitrogen oxide-containing raw exhaust gas, b) introducing the nitrogen oxide-containing raw exhaust gas into a catalytic evaporator (1), c) introducing a fuel into the catalytic evaporator (1), whereby a converted fuel is obtained, d) mixing urea with the converted fuel, and e) feeding the mixture obtained after step d) into an exhaust gas post treatment system (8). Alternatively or in addition, a device may be provided for exhaust gas post treatment.

14 Claims, 3 Drawing Sheets

(51) Int. Cl.
  *B01D 53/86* (2006.01)
  *B01D 53/94* (2006.01)
  *F01N 3/08* (2006.01)
  *F01N 3/36* (2006.01)

(52) U.S. Cl.
  CPC ............. *F01N 3/36* (2013.01); *B01D 53/58* (2013.01); *B01D 53/864* (2013.01); *F01N 2240/25* (2013.01); *F01N 2240/30* (2013.01); *F01N 2240/40* (2013.01); *F01N 2610/02* (2013.01); *F01N 2610/03* (2013.01)

(56) References Cited

U.S. PATENT DOCUMENTS

| | | | | |
|---|---|---|---|---|
| 8,370,049 | B1* | 2/2013 | Shimizu | F02D 19/0671 123/304 |
| 11,781,747 | B2 | 10/2023 | Aicher et al. | |
| 11,952,931 | B2 | 4/2024 | Szolak et al. | |
| 2006/0213187 | A1* | 9/2006 | Kupe | F01N 3/035 60/286 |
| 2008/0098728 | A1* | 5/2008 | Winkler | F01N 3/106 60/274 |
| 2008/0102010 | A1* | 5/2008 | Bruck | F01N 3/0814 423/239.1 |
| 2008/0274021 | A1* | 11/2008 | Neels | C01B 3/36 422/198 |
| 2010/0224142 | A1* | 9/2010 | Iwamoto | F01N 3/106 123/3 |
| 2011/0061374 | A1 | 3/2011 | Noritake | |

FOREIGN PATENT DOCUMENTS

| | | | |
|---|---|---|---|
| DE | 102015120106 | A1 | 5/2017 |
| EP | 238845 | A1 | 9/1987 |
| EP | 2 295 755 | A2 | 3/2011 |
| EP | 2368024 | A1 | 9/2011 |
| EP | 2 388 451 | A1 | 11/2011 |
| EP | 2570625 | A1 | 3/2013 |
| EP | 2631006 | A2 | 8/2013 |
| EP | 2 368 024 | B1 | 11/2015 |
| EP | 2570625 | B1 | 3/2016 |
| JP | 2009-13932 | A | 1/2009 |
| JP | 2010-248943 | | 11/2010 |
| JP | 2011-64069 | | 3/2011 |
| WO | WO 2010/069528 | A | 6/2010 |
| WO | WO 2010/082308 | A1 | 7/2010 |

OTHER PUBLICATIONS

Office Action received for Japan Patent Application No. 2022-502514 mailed Oct. 23, 2023 (11 pages).
International Search Report regarding PCT/EP2020/070017 dated Aug. 14, 2020.
"Clean and Mobile—TMT—Thermo Management Technology," HJS Emission Technology Gmbh & Co. KG: HJS Emission Technology, Menden, Germany, dated Dec. 15, 2016, p. 3.
"What Is a Diesel Oxidation Catalyst?" Net Technologies Inc., Retrieved from https://www.nettinc.com/information/emissions-faq/what-is-a-diesel-oxidation-catalyst, dated prior to Jul. 1, 2019 [Retrieved Apr. 15, 2025], pp. 1-2.
Costa, C. N., et al., "Low-temperature H2-SCR of NO on a novel Pt/MgO—CeO2 catalyst," Applied Catalysts B: Environmental, 72 (2007), dated Nov. 30, 2006, pp. 240-252.
Decker, Marko, et al., "The commercial vehicle engine of the future with regard to emissions legislation" (in German "Der Nutzfahrzeugmotor der Zukunft mit Blick auf die Emissionsgesetzgebungen"), Motortechnische Zeitschrift (MTZ), vol. 78, Issue 11, 2017 [Retrieved on Jul. 29, 2019], p. 29, right col, last para.—p. 30, right col, para. 1.—ISSN 2192-8843 (E); 0024-8525 (P). DOI: 10.1007/s35146-017-0110-3. Retrieved from https://link.springer.com/content/pdf/10.1007%2Fs35146-017-0110-3.pdf.
Hadl, Klaus, et al., "System analysis for efficient and clean diesel engines" (in German "Systembetrachtung für effiziente und saubere Dieselmotoren"), Motortechnische Zeitschrift (MTZ), vol. 78, Issue 7-8, 2017, p. 41, title and 1st para, left col, lines 11-17; p. 41 right col—p. 42, left col, line 3; p. 42, left col. lines 9—middle col, line 12; p. 42, right col, lines 8-14; p. 43, right col, line 16—p. 44, middle col, last line, and FIG. 5; p. 44, right col, line 15—p. 45, left col, line 3; p. 45, left col, last para—right col, last line.—ISSN 2192-8843 (E); 0024-8525 (P).
Krämer, Lutz, et al., "With the diesel exhaust gas after-treatment on the way to SULEV standard" (in German "Mit der Diesel-Abgasnachbehandlung auf dem Weg zum SULEV-Standard"), Motortechnische Zeitschrift (MTZ), vol. 75, Issue 1, 2014 [Retrieved Jul. 29, 2019], p. 27, para 2—p. 28, left col.—ISSN 2192-8843 (E); 0024-8525 (P). Retrieved from https://link.springer.com/content/pdf/10.1007%2Fs35146-014-0010-8.pdf.
Kröcher, et al., "Active Sites, Deactivation and Stabilization of Fe—ZSM—5 for the Selective Catalytic Reduction (SCR) of NO with NH3," Schweizerische Chemische Gesellschaft, CHIMIA 2012, 66, No. 9, Sep. 26, 2012, pp. 687-693. doi:10.2533/chimia.2012.687.
Presti, M. et al., "Exhaust gas after-treatment close to the engine in commercial vehicles: A solution for CARB 2020 NOx?" (in German "Motornahe Abgasnachbehandlung im Nutzfahrzeug: Eine Lösung für CARB 2020 NOx?"), 5th Dresden Engine Colloquium, Dresden, Germany , Jun. 2003, p. 2, para 4 of Introduction.
Sharp, C. et al., "Achieving Ultra Low NOX Emissions Levels with a 2017 Heavy-Duty On-Highway TC Diesel Engine—Comparison of Advanced Technology Approaches," SAE Int. J. Engines, 10(4):2017, Mar. 2017, pp. 240-252. doi: 10.4271/2017-01-0958.
Spurk, et al., "NO2 formation on the DOC/DPF system—a system thought," 6th International Forum on Exhaust and Particle Emissions, Mar. 9-10, 2010, Forum am Schlosspark, Ludwigsburg Germany, 2010, pp. 135-146.—ISBN 978-3-00-028287-4.
Väliheikki, A. et al., "Selective catalytic reduction of NOx by hydrogen (H2—SCR) on WOx-promoted CezZr1-zO2 solids," Applied Catalysts B: Environmental, 156-157, 72-83 (2014), Mar. 13, 2014, pp. 1-12. http://dx.doi.org/10.1016/j.apcatb.2014.03.008.

* cited by examiner

DEVICE AND METHOD FOR EXHAUST GAS POST TREATMENT AND USE THEREOF

CROSS-REFERENCE TO RELATED APPLICATIONS

This application is a 371 nationalization of international patent application PCT/EP2020/070017 filed Jul. 15, 2020, which claims priority under 35 USC § 119 to German patent application DE 10 2019 210 413.4 filed Jul. 15, 2019. The entire contents of each of the above-identified applications are hereby incorporated by reference.

TECHNICAL FIELD

The invention relates to a method for the exhaust gas post treatment of an internal combustion engine, the use of a catalytic evaporator in a method of this type, a device for exhaust gas post treatment, in particular adapted to carry out the method according to the invention, and the use of this device for exhaust gas post treatment.

DETAILED DESCRIPTION

Figure 1A:
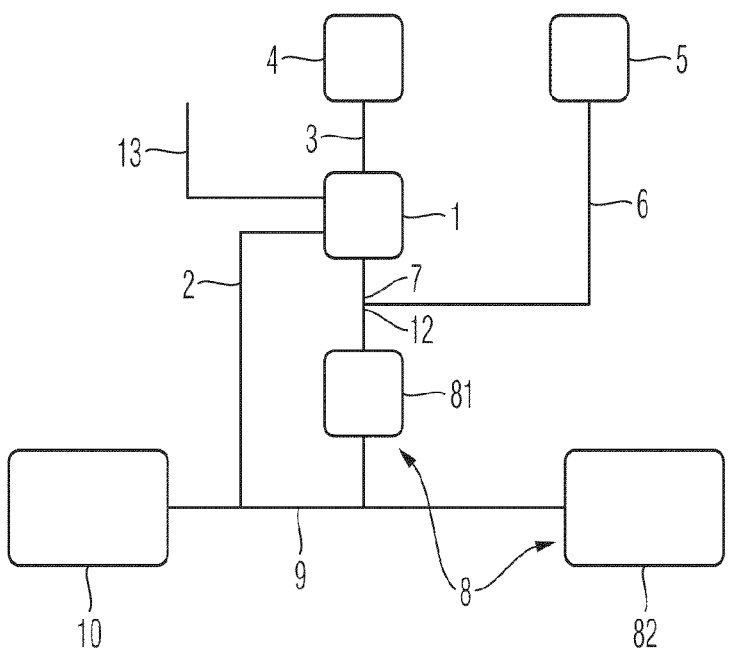
FIG. 1a, b is a schematic diagram of an embodiment of a device for exhaust gas post treatment.

Exhaust gas post treatment is the term used for methods in which the combustion gases are cleaned in a mechanical, catalytic or chemical way after they have left the combustion chamber of an internal combustion engine. Catalysts and reducing agents, such as ammonia, are used for reducing nitrogen oxides (NOx) using the selective catalytic reduction (SCR) technology. For this purpose, an aqueous urea solution is injected, from which ammonia is produced by thermolysis and hydrolysis in the further course of transport through the exhaust gas pipe. Three-way catalysts can be used for reducing hydrocarbons and carbon monoxide.

The effectiveness of catalytic exhaust gas post treatment, i.e. the transformation or conversion rate, depends crucially on the operating temperature, in addition to other factors. Below about 250° C., virtually no reactions take place. This is the reason why even modern vehicles exhibit high pollutant emissions after a cold start. In these operating states, the catalyst is not yet at operating temperature and therefore converts the emitted pollutants only inadequately.

There are some strategies for raising the exhaust gas temperature quickly. For example, the catalyst can be placed close to the engine in the exhaust gas system. However, at least in the case of gasoline engines, this entails the risk of temperatures becoming too high in other operating states, e.g. near the rated power, since temperatures of 1000° C. destroy the catalyst. Good conversion rates and a long service life are given at 400° C. to 800° C. Alternatively, the exhaust gas temperature can be raised by electric heaters or by post-injections both inside the engine and/or in the exhaust gas system.

However, these measures have the effect of further increasing fuel consumption after a cold start and generating additional emissions.

Proceeding from the prior art, the object of the invention is therefore to provide an exhaust gas post treatment, possibly including selective catalytic reduction, which allows catalytic conversion at lower temperatures.

According to the invention, a method for exhaust gas post treatment, in particular for removing nitrogen oxides, is proposed, which contains the following steps:
 a) providing a nitrogen oxide-containing raw exhaust gas,
 b) introducing the nitrogen oxide-containing raw exhaust gas into a catalytic evaporator,
 c) introducing a fuel into the catalytic evaporator, as a result of which a converted fuel is obtained,
 d) mixing urea with the converted fuel, and
 e) supplying the mixture obtained according to step d) to the exhaust gas post treatment system.

The evaporation of the fuel in step c) changes the composition of the fuel. In particular, $H_2$ and/or CO and/or hydrocarbons, e.g. short-chain hydrocarbons with 1 to 10 C atoms, are produced, in some embodiments of the invention the components with 1-5 carbon atoms constituting the major part (>66%).

It is advantageous to use in step e) the heat of the catalytic evaporation to evaporate and convert (thermolysis and hydrolysis) urea. This method is used when the exhaust gas contains nitrogen oxides. In this respect, a controlled system is envisaged. At engine map points where the exhaust gas contains more nitrogen oxides, it is connected. At other engine map points where combustion produces few or tolerable amounts of nitrogen oxides, the system is not active. If it is not active, the supply for air and exhaust gas is stopped.

The nitrogen oxide-containing raw exhaust gas can be an untreated raw exhaust gas. It can also be a treated raw exhaust gas, which is e.g. treated with a particulate filter and/or diesel oxidation catalyst.

Steps b) and c) can be carried out at the same time. In step e), the mixture can be supplied directly into the exhaust gas post treatment system or by introducing it into the exhaust gas line leading from the engine to the exhaust gas post treatment system.

The method according to the invention was developed on the basis of the catalytic evaporation technology, which is known per se. This method uses nitrogen oxide-containing raw exhaust gas from an engine, liquid fuel and a urea solution. The catalytic conversion of the fuel in the catalytic evaporator generates heat within the system. In this way, the system becomes much more independent of engine operation. It thus becomes possible to produce reducing agent from the aqueous urea solution in a manner that is independent of the engine operation, in particular of the exhaust gas temperature and exhaust gas mass flow. In addition, the method according to the invention generates from the added fuel hydrogen and hydrocarbons, e.g. ethene, which are used as additional reactant, i.e. reducing agent, for the SCR system of the EGT.

The supplied quantities of urea solution and fuel are the usual quantities used in the catalytic evaporator operation known per se.

The nitrogen oxide-containing raw exhaust gas added to the catalytic evaporator can be a part of the usual engine exhaust gases, i.e. a part of the engine exhaust gas stream can be branched off and provided in step a) as nitrogen oxide-containing raw exhaust gas which is introduced into the catalytic evaporator. Such a division can be effected by flaps or slides in the exhaust gas line, which can be driven accordingly. The raw exhaust gas can also be discharged directly from the engine and supplied to the catalytic evaporator.

The method according to the invention advantageously achieves that, in contrast to heating the entire exhaust gas stream according to the prior art, only a small partial stream of the nitrogen oxide-containing raw exhaust gas needs to be heated. The conversion of the fuel also generates further heat that does not have to be introduced electrically. For a catalytic conversion, only the catalyst needs to be heated. The reactions can be controlled by varying the reactant streams.

In the method according to the invention, catalytic evaporators can be used that are known per se from the prior art. A person skilled in the art also knows how they can be operated in principle. An example of a catalytic evaporator that can be used in the method according to the invention is described in DE 10 2015 120 106 A1, to which full reference is made with respect to the design details and the mode of operation.

The catalytic evaporator used in the method according to the invention can have a catalyst, which can be applied e.g. to a support. The support with the catalyst can be placed in a reaction vessel in such a way that an intermediate space is formed between the inner surface of the reaction vessel and the catalyst surface.

In the operation of a catalytic evaporator, e.g. the liquid fuel can be added to the inner surface of the reactor wall of a catalytic evaporator while an oxidant, e.g. air, is supplied to the catalyst side. A small portion of the fuel oxidizes over the catalyst and the heat generated in this process is used to completely evaporate the fuel. The heat is mainly transferred by thermal radiation from the hot catalyst surface to the surface of the fuel. Here, the reactor wall to which the fuel is applied is colder than the fuel itself. No deposits or incrustations are formed.

The nitrogen oxide-containing raw exhaust gas supplied in step a) can contain residual oxygen. If the concentration of residual oxygen in the raw exhaust gas is sufficient, this can be sufficient as an oxidant to operate the catalytic evaporator. If the residual oxygen concentration in the nitrogen oxide-containing raw exhaust gas is too low, it is possible in one embodiment to further introduce an oxidant into the catalytic evaporator in step c). This oxidant is an additional oxidant to the residual oxygen in the raw exhaust gas. An oxidant of this type can be oxygen or an oxygen-containing medium, in particular air. The amount of oxidant can here be chosen so as to achieve the usual amounts of oxidant in a catalytic evaporator. The air can come from the environment and optionally be charged by a turbocharger.

The mixture formed according to step d) can include hydrogen ($H_2$) as a reducing agent. Furthermore, the mixture can additionally include $NH_3$, CO, hydrocarbons, e.g. ethene, and mixtures thereof.

By varying the reactant streams, namely fuel, urea solution, nitrogen oxide-containing raw exhaust gas, and optionally oxidant, an individual reducing agent can be provided depending on the operating point in the engine map. The provision of this reducing agent in the method according to the invention increases the activity of the SCR system and thus the reduction of nitrogen oxides in the engine exhaust gas. The advantage is particularly effective at cold start and other operating points with a cold exhaust gas post treatment system.

In one embodiment, the exhaust gas post treatment system can comprise a device for thermolysis and hydrolysis, such as a hydrolysis catalyst, and a device for the selective catalytic reduction (SCR). Devices of this type are known per se so that a person skilled in the art knows how they are designed and how they can be operated. For the method according to the invention, it has turned out to be advantageous to install the device for thermolysis and hydrolysis and the device for SCR in housings that are separate from one another. In this way it is possible to use these devices, in particular the device for hydrolysis, at particularly suitable points in the method according to the invention. The device for thermolysis and hydrolysis (hydrolysis catalyst) can be located in the partial exhaust gas stream or in the main exhaust gas stream.

In some embodiments, the urea can be used in the form of a urea solution, e.g. an aqueous urea solution, in particular a 32.5 percent urea solution. This solution has been found to be particularly suitable for exhaust gas post treatment systems.

In one embodiment, mixing of the urea solution with the evaporated fuel can take place upstream of or in the exhaust system. In the method according to the invention, the mixture from step d) is introduced into an exhaust gas post treatment system. This can be done by introducing this mixture into the exhaust system connecting the engine to the exhaust post treatment system. Mixing of the urea solution, which can possibly be evaporated, with the evaporated fuel can be carried out prior to the supply to the exhaust gas system and/or in the exhaust gas system.

In a further embodiment, the mixture from step d) can first be supplied to the device for hydrolysis and the product obtained therefrom can subsequently be supplied to the device for SCR.

In a further embodiment, the exhaust gas post treatment, possibly including the selective catalytic reduction, can already be operated at a temperature of about 170° C. or about 180° C. or about 190° C. or about 200° C. This means, therefore, that with the method according to the invention, exhaust gas post treatments can already start and be carried out at significantly lower temperatures than known in the prior art.

The method according to the invention can be used for converting nitrogen oxides for SCR systems of any type of internal combustion engines operating with an SCR system for the reduction of NOx emissions.

The subject matter of the invention is further to use a catalytic evaporator, as described in detail above, in a method according to the invention, as also described in detail above.

Furthermore, a reducing agent is provided that can be obtained by the method according to the invention. With respect to the production method and the composition, reference is made to the above explanations. In particular, the reducing agent includes hydrogen, hydrocarbons, in particular ethene, ammonia and/or carbon monoxide.

In addition, a device for exhaust gas post treatment, e.g. including SCR, is described, the device comprising:
  a catalytic evaporator,
  a raw exhaust gas supply line to the catalytic evaporator adapted to introduce nitrogen oxide-containing raw exhaust gas into the catalytic evaporator,
  a fuel supply line to the catalytic evaporator adapted to introduce fuel into the catalytic evaporator,
  a discharge line from the catalytic evaporator, adapted to discharge the evaporated fuel from the catalytic evaporator,
  if necessary, a urea reservoir and a urea supply line, which is connected to a space for mixing evaporated fuel obtained in the catalytic evaporator and urea, and
  an exhaust gas post treatment system.

The term "adapted", as used above, indicates that the corresponding lines are designed in such a way that the materials to be supplied therein can be conducted without any negative effects, i.e. they are e.g. inert with respect to the materials to be conducted. Furthermore, the term "adapted" also indicates that the corresponding lines are connected to reservoirs having the materials to be supplied.

The device according to the invention is particularly suitable for carrying out the above described method according to the invention. Therefore, design details and the operation of the device also result from the above representations of the method according to the invention.

In one embodiment, the exhaust gas post treatment system comprises a device for hydrolysis and a device for selective catalytic reduction known per se. A device for hydrolysis can comprise, for example, a hydrolysis catalyst. A device for selective catalytic reduction can comprise, for example, a catalyst for selective catalytic reduction. In this regard, the device for hydrolysis and the device for selective catalytic reduction can be provided in different housings from each other. This makes it possible to install these devices independently of one another at different locations of the device according to the invention and still to carry out a coherent exhaust gas treatment. The device for hydrolysis can be located in the partial exhaust gas stream or in the main exhaust gas stream.

In one embodiment, the device according to the invention can further comprise a urea evaporator adapted to evaporate the urea solution before mixing it with the evaporated fuel. The advantage of urea solution evaporation and catalytic fuel evaporation is the separation of functions. This means that the state of the art in urea evaporation can be used. These do not have to be matched and yet an improved reducing agent is produced with $NH_3$ (from urea), $H_2/CO$/ethene (from the fuel).

In one embodiment, the space for mixing can be the discharge line and/or the exhaust gas system.

In one embodiment of the device according to the invention, the device can further comprise an oxidant supply line to the catalytic evaporator adapted to introduce oxidant into the catalytic evaporator. Such a supply of oxidant, for example oxygen or air, can be required if the raw exhaust gas does not have the necessary residual oxygen concentration.

Furthermore, the subject matter of the invention relates to the use of the device, as described above, for exhaust gas post treatment, including a selective catalytic reduction.

With the above described device, the advantages obtained by the method according to the invention can be achieved in a simple and cost-effective manner.

The invention will be explained in more detail below with reference to drawings without limiting the general concept of the invention.

FIG. 1a schematically shows a device with a catalytic evaporator 1, which is explained in more detail in FIGS. 3 and 4 below, for exhaust gas post treatment. An engine 10, e.g. a diesel engine, is used in the usual manner to operate a motor vehicle, fuel and air being supplied to the engine. The resulting nitrogen oxide-containing raw exhaust gases are discharged from the engine 10 through an exhaust gas system 9. These nitrogen oxide-containing raw exhaust gases from the engine 10 are supplied to a device for exhaust gas post treatment 8. The exhaust gas post treatment 8 has a device for hydrolysis 81, e.g. a hydrolysis catalyst, and a device for the selective catalytic reduction 82. The device for hydrolysis 81 and the device for selective catalytic reduction are located in separate housings. At least a portion of the nitrogen oxide-containing raw exhaust gas is branched off via the raw exhaust gas supply line 2 upstream of the exhaust gas system 9 and supplied to the catalytic evaporator 1. Fuel is supplied to the catalytic evaporator 1 from a fuel reservoir 4 via a fuel supply line 3. Via an oxidant supply line 13, an oxidant, for example air, can be supplied to the catalytic evaporator 1, if necessary. The fuel evaporated in the catalytic evaporator 1 is discharged from the catalytic evaporator 1 via the discharge line 7. The urea solution is introduced into the discharge line 7 from the urea reservoir 5 via a urea supply line 6. The discharge line 7 functions as a space for mixing 12 evaporated fuel and urea. The device for hydrolysis 81, which is part of the exhaust gas post treatment system 8, is separate from the device for SCR 82. The device for hydrolysis 81 is located downstream of the space for mixing 12 and upstream of the exhaust gas system 9, whereas the device for SCR 82 is provided downstream of the exhaust gas system 9 at a place after the mixture from the catalytic evaporator 1 has been supplied to the exhaust gas system 9.

Figure 1B:
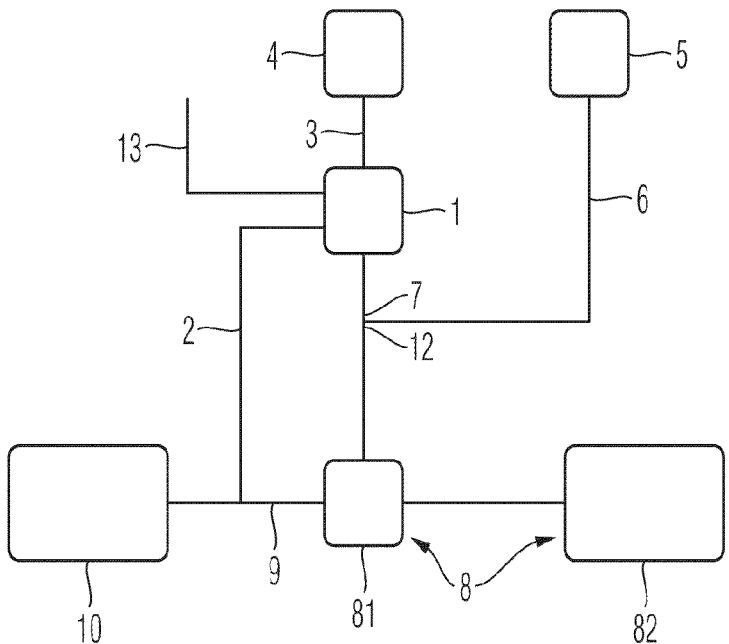

FIG. 1b shows a further embodiment of the device according to the invention, It corresponds to the device illustrated in FIG. 1a, the device for hydrolysis 81 being disposed in the exhaust gas system (main exhaust gas stream) 9.

Figure 2:
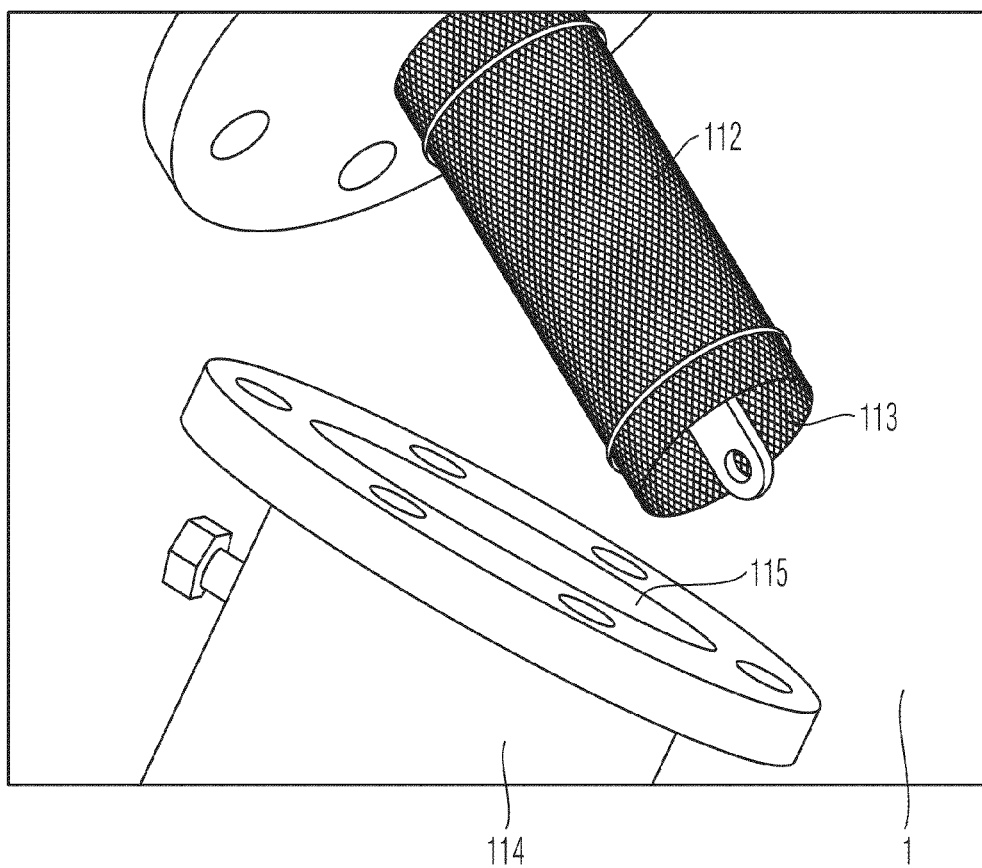
FIG. 2 shows a view of an exemplarily usable catalytic evaporator.

FIG. 2 shows a catalytic evaporator 1 as can be used in the method according to the invention. The catalytic evaporator 1 has a catalyst 112 which is applied to a metal mesh 113. It is possible to use as catalyst 112 and as metal mesh 113 materials that are known from the prior art. The metal mesh 113 with the catalyst 112 can be present in a reaction vessel 114. For reasons of overview, the diagram in FIG. 2 is shown in such a way that the catalyst 112 with the metal mesh 113 is pulled out of the reaction vessel 114. If the catalyst 112 with the metal mesh 113 is pushed into the reaction vessel, an intermediate space is formed on the metal mesh 113 between the inner surface 115 of the reaction vessel 114 and the surface of the catalyst 112.

Figure 3:
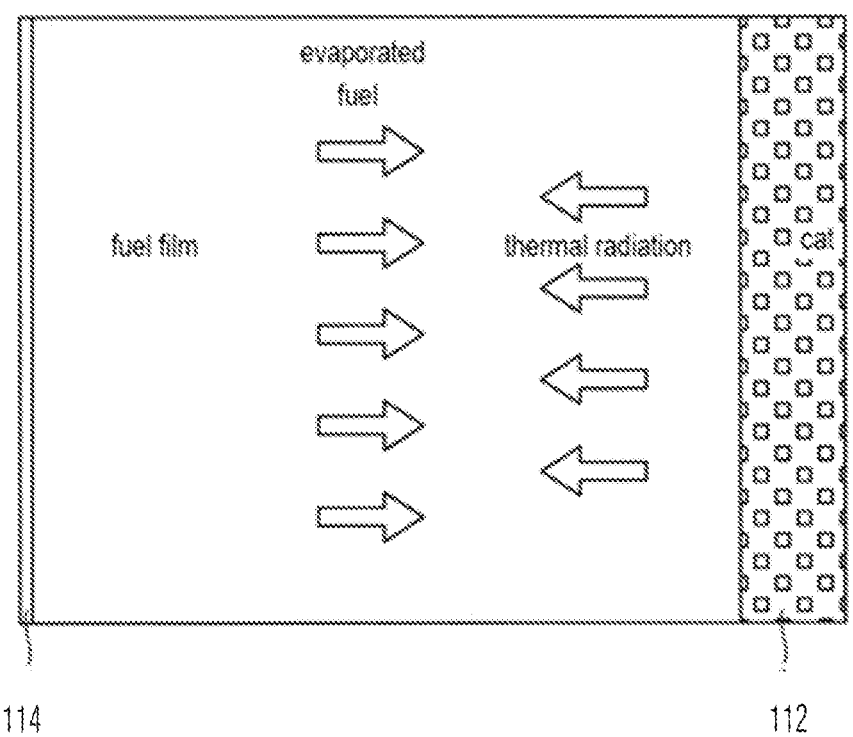
FIG. 3 shows the principle of operation of the catalytic evaporator of FIG. 2.

FIG. 3 schematically shows the mode of operation of the catalytic evaporator illustrated in FIG. 2. The fuel is applied to the lower surface of the reactor vessel 114, while the untreated raw exhaust gas and, if necessary, a further oxidant are supplied to the catalyst side. A small portion of the fuel oxidizes over the catalyst 112 and the heat generated in this process is used to completely evaporate the fuel. The heat is predominantly transferred by thermal radiation from the hot surface of the catalyst 112 to the surface of the fuel film. The wall of the reactor vessel 114 to which the fuel is applied can here be colder than the fuel itself. Thus, no deposits or incrustations are formed.

Of course, the invention is not limited to the embodiment illustrated in the drawings. Therefore, the above description should not be regarded as restrictive but as explanatory. The following claims are to be understood in such a way that a stated feature is present in at least one embodiment of the invention. This does not exclude the presence of further features. If the description or the claims define "first" and "second" features, this is done to distinguish between two similar features without determining a ranking order.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A method for exhaust gas post treatment, comprising:
   a) providing a nitrogen oxide-containing raw exhaust gas from an engine,
   b) introducing the nitrogen oxide-containing raw exhaust gas into a catalytic evaporator,
   c) introducing a fuel into the catalytic evaporator so as to obtain a converted fuel, wherein said converted fuel comprises any of $H_2$, CO, and hydrocarbons having 1 to 10 C atoms,
   d) mixing urea with the converted fuel, and
   e) supplying the mixture obtained according to step d) to an exhaust gas post treatment system.

2. The method of claim 1, wherein further an oxidant is introduced into the catalytic evaporator in step c).

3. The method of claim 1, wherein the exhaust gas post treatment system comprises a device for hydrolysis and a device for the selective catalytic reduction.

4. The method of claim 1, wherein the urea is used in the form of a urea solution.

5. The method of claim 1, wherein the mixing of the urea with the evaporated fuel is carried out upstream of or in a part of the exhaust gas system.

6. The method of claim 1, wherein the mixture from step d) is supplied to the device for hydrolysis and the subsequently obtained product is supplied to the device for the selective catalytic reduction.

7. The method of claim 1, wherein the exhaust gas post treatment can be operated at a temperature of about 170° C. or higher.

8. The method of claim 1, wherein a major part of said hydrocarbons of said converted fuel comprises hydrocarbons having 1 to 5 C atoms.

9. A device for exhaust gas post treatment, comprising:
   a catalytic evaporator,
   a raw exhaust gas supply line to the catalytic evaporator, configured to introduce nitrogen oxide-containing raw exhaust gas from an engine into the catalytic evaporator,
   a fuel supply line to the catalytic evaporator, configured to introduce fuel into the catalytic evaporator,
   a discharge line from the catalytic evaporator, configured to discharge the evaporated fuel from the catalytic evaporator, and
   an exhaust gas post treatment system, wherein
   the catalytic evaporator is configured to provide a converted fuel to the exhaust gas post treatment system, said converted fuel comprising any of $H_2$, CO, and hydrocarbons having 1 to 10 C atoms.

10. The device of claim 9, comprising further a urea reservoir and a urea supply line, which is connected to a space for mixing converted fuel obtained in the catalytic evaporator and urea.

11. The device of claim 9, wherein the exhaust gas post treatment system comprises a device for hydrolysis and a device for selective catalytic reduction.

12. The device of claim 11, wherein the device for hydrolysis and the device for selective catalytic reduction are present in housings separated from each other.

13. The device of claim 9, wherein the space for mixing is any of the discharge line and an exhaust gas system.

14. The device of claim 9, wherein it further has an oxidant supply line to the catalytic evaporator, configured to introduce an oxidant into the catalytic evaporator.

* * * * *